United States Patent
Lee et al.

(10) Patent No.: US 8,185,898 B2
(45) Date of Patent: May 22, 2012

(54) METHOD OF STREAMING REMOTE PROCEDURE INVOCATION FOR MULTI-CORE SYSTEMS

(75) Inventors: Jenq Kuen Lee, Hsinchu County (TW); Kun Yuan Hsieh, Changhua County (TW)

(73) Assignee: National Tsing Hua University, Hsinchu (TW)

( * ) Notice: Subject to any disclaimer, the term of this patent is extended or adjusted under 35 U.S.C. 154(b) by 314 days.

(21) Appl. No.: 12/571,986

(22) Filed: Oct. 1, 2009

(65) Prior Publication Data

US 2011/0083133 A1    Apr. 7, 2011

(51) Int. Cl.
*G06F 9/46*    (2006.01)

(52) U.S. Cl. ........ 718/100; 719/330; 709/201; 709/203; 709/230; 709/231

(58) Field of Classification Search .................. None
See application file for complete search history.

(56) References Cited

U.S. PATENT DOCUMENTS 5,951,694 A * 9/1999 Choquier et al. ............... 714/15

FOREIGN PATENT DOCUMENTS

| TW | I258703 | 7/2006 |
|---|---|---|
| TW | I292127 | 1/2008 |
| TW | 200817925 | 4/2008 |

OTHER PUBLICATIONS

Yen-Chih Liu et al. (The support of software design patterns for streaming RPC on embedded multicore processors, 2008, IEEE).*
Office Action received on Feb. 13, 2012 for Taiwan counterpart patent application 097119465.
TW I292127 is the counterpart for US patent US7222343.
TW I258703 is the counterpart for US patent publication US20050027914.
TW 200817925A is the counterpart for US patent US7966481.

* cited by examiner

*Primary Examiner* — Emerson Puente
*Assistant Examiner* — Sisley Kim
(74) *Attorney, Agent, or Firm* — WPAT, P.C.; Anthony King

(57) ABSTRACT

A method of streaming remote procedure invocation for multi-core systems to execute a transmitting thread and an aggregating thread of a multi-core system comprises the steps of: temporarily storing data to be transmitted; activating the aggregating thread if the amount of the temporarily stored data is equal to or greater than a threshold and the aggregating thread is at pause status; pausing the transmitting thread if there is no space to temporarily store the data to be transmitted; retrieving data to be aggregated; activating the transmitting thread if the amount of the data to be aggregated is less than a threshold and the transmitting thread is at pause status; and pausing the aggregating thread if there is no data to be retrieved.

7 Claims, 6 Drawing Sheets

METHOD OF STREAMING REMOTE PROCEDURE INVOCATION FOR MULTI-CORE SYSTEMS

BACKGROUND OF THE INVENTION

1. Field of the Invention

The present invention relates to remote procedure call (RPC), and more particularly, to streaming remote procedure call.

2. Description of the Related Art

With the increasing prevalence of multimedia application software, more and more dual-core processors, or even multi-core processors, utilize such multimedia application software to meet efficiency requirements. An ordinary multi-core processor comprises a plurality of processing units, which can be connected via many types of communication mechanisms, such as shared memory, memory mapping interrupts, mailbox and channel-based protocol.

One advantage of multi-core processors is that each processing unit executes its own procedure with parallel computing. However, due to the varieties of the programming environment of each processing unit, the complexity of the software development has increased. Accordingly, one technique, known as Remote Procedure Call (RPC) has been widely applied to improve the software development efficiency. RPC is the technique for a client calling a server to execute a specific procedure. In other words, whether on a client or a server, a software designer can write the same computer program without making adjustments to accommodate different programming environments.

One present challenge for multi-core processors is providing a suitable data streaming mechanism for multimedia applications. Various multimedia applications, such as video encoding and decoding, image processing, data mining and graphical rendering all require the data streaming mechanism. However, when executing RPC, most present multi-core processors used with multimedia applications will not send data back to the client until the server finishes its procedure. Such waiting is not time-efficient for real-time multimedia applications. Therefore, finding a method to execute RPC by streaming is the one of the most crucial issues for RPC technique.

SUMMARY OF THE INVENTION

One objective of the present invention is to provide a method of streaming remote procedure invocation for multi-core systems and a middleware to implement the method. The method temporarily stores data to be transmitted to a server to prevent the need for a client to repeatedly call the server and thus improves the data transmitting efficiency.

The method of streaming remote procedure invocation for multi-core systems to execute a transmitting thread and an aggregating thread of a multi-core system according to one embodiment of the present invention comprises the steps of: temporarily storing data to be transmitted; activating the aggregating thread if the amount of the temporarily stored data is equal to or greater than a threshold and the aggregating thread is at pause status; pausing the transmitting thread if there is no space to temporarily store the data to be transmitted; retrieving data to be aggregated; activating the transmitting thread if the amount of the data to be aggregated is less than a threshold and the transmitting thread is at pause status; and pausing the aggregating thread if there is no data to be retrieved.

In some embodiments of the present invention, the method of streaming remote procedure invocation for multi-core systems is executed by a middleware. The middleware comprises a streaming channel module, a plurality of streaming buffer modules and a streaming controller module. The streaming channel module is configured to be the communication channel for transmitting streaming data between the clients and the servers. The plurality of streaming buffer modules is configured to temporarily store the data to be transmitted on the streaming channel module. The streaming controller module is configured to control the streaming channel module and the streaming buffer modules

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
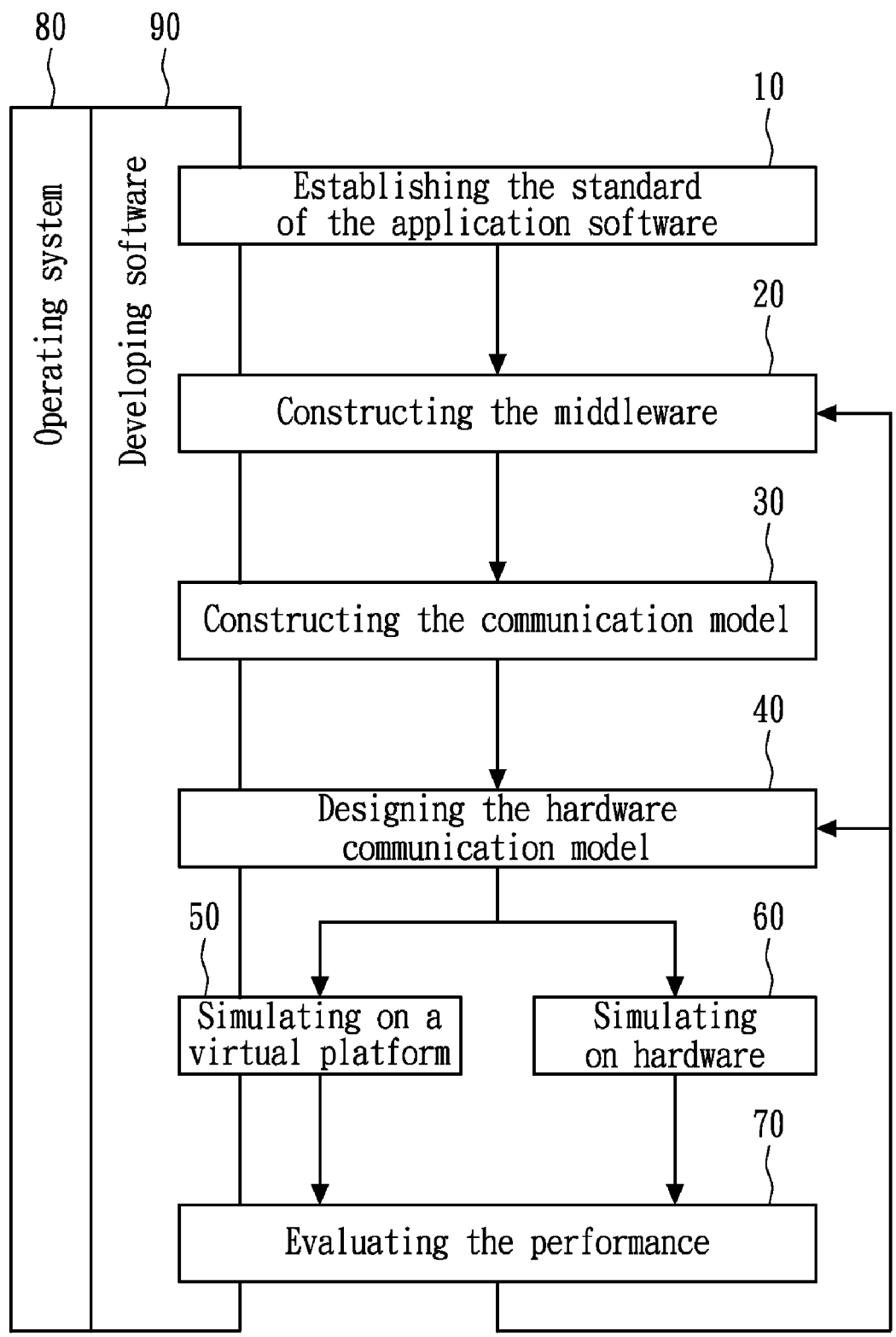
FIG. 1 shows the development procedure of an embedded software, wherein the embedded software is one embodiment of the method of streaming remote procedure invocation for multi-core systems of the present invention.

FIG. 1 shows the development procedure of an embedded software, wherein the embedded software is one embodiment of the method of streaming remote procedure invocation for multi-core systems of the present invention. As shown in FIG. 1, the development procedure is accomplished by developing software 90 on an operating system 80. The developing software 90 comprises a compiler, an assembler and a linker. In step 10, the standard of the application software corresponding to the developing software is established. In step 20, the middleware of the streaming remote procedure invocation is constructed. In step 30, the communication model of the embedded software is constructed by the middleware. In step 40, the hardware communication model, including shared memory, mailbox and direct memory access, is designed according to the hardware realization which is compatible with the communication model of the embedded software. Steps 50 and 60 are for verification. In step 50, the embedded software is simulated on a virtual platform. In step 60, the embedded software is realized on a hardware development platform. In step 70, the performance of the embedded software is evaluated. If the performance of the embedded software does not meet the requirement, step 40 is executed to refine the hardware communication model, or step 20 is executed to modify the middleware.

As shown in FIG. 1, a middleware is constructed on the communication model of the embedded software in this embodiment to provide a high hierarchy developing environment such that the tedious software developing procedures specific to individual hardware platforms is reduced.

Figure 2:
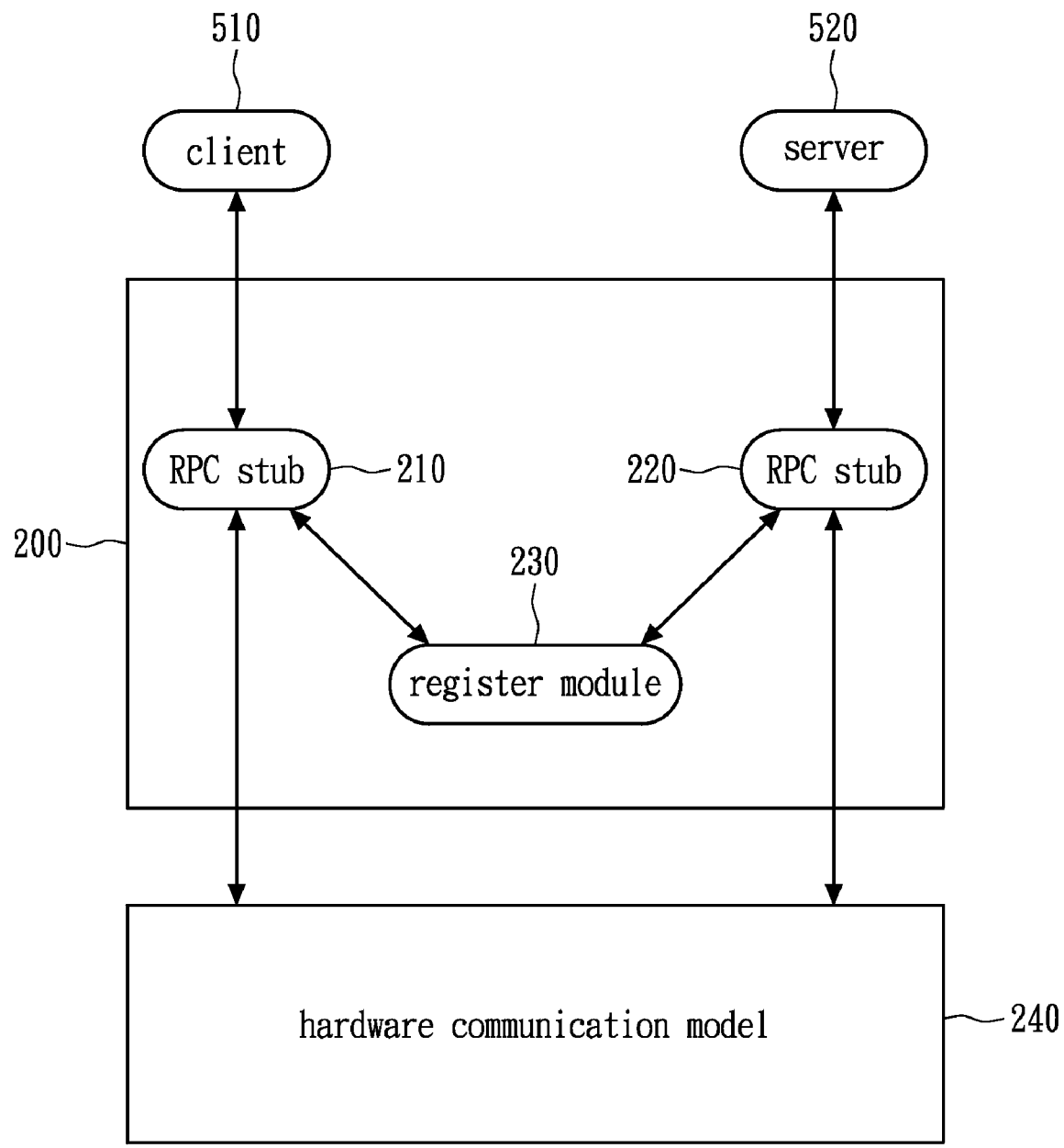
FIG. 2 shows a software framework of a conventional dual-core system applied to an ordinary RPC mechanism.

FIG. 2 shows a software framework of a conventional dual-core system applied to an ordinary RPC mechanism. The software framework 200 is constructed on a hardware communication model 240. The dual-core system comprises a client 510 and a server 520. As shown in FIG. 2, when the client 510 requires the service of RPC, RPC stubs 210 and 220 are executed first for the processing of the RPC. As shown in FIG. 2, the RPC stubs 210 and 220 exchange data with each other via a register module 230. The middleware applied to the streaming remote procedure invocation for multi-core systems of some embodiments of the present invention is constructed on the hardware communication model 240.

Figure 3:
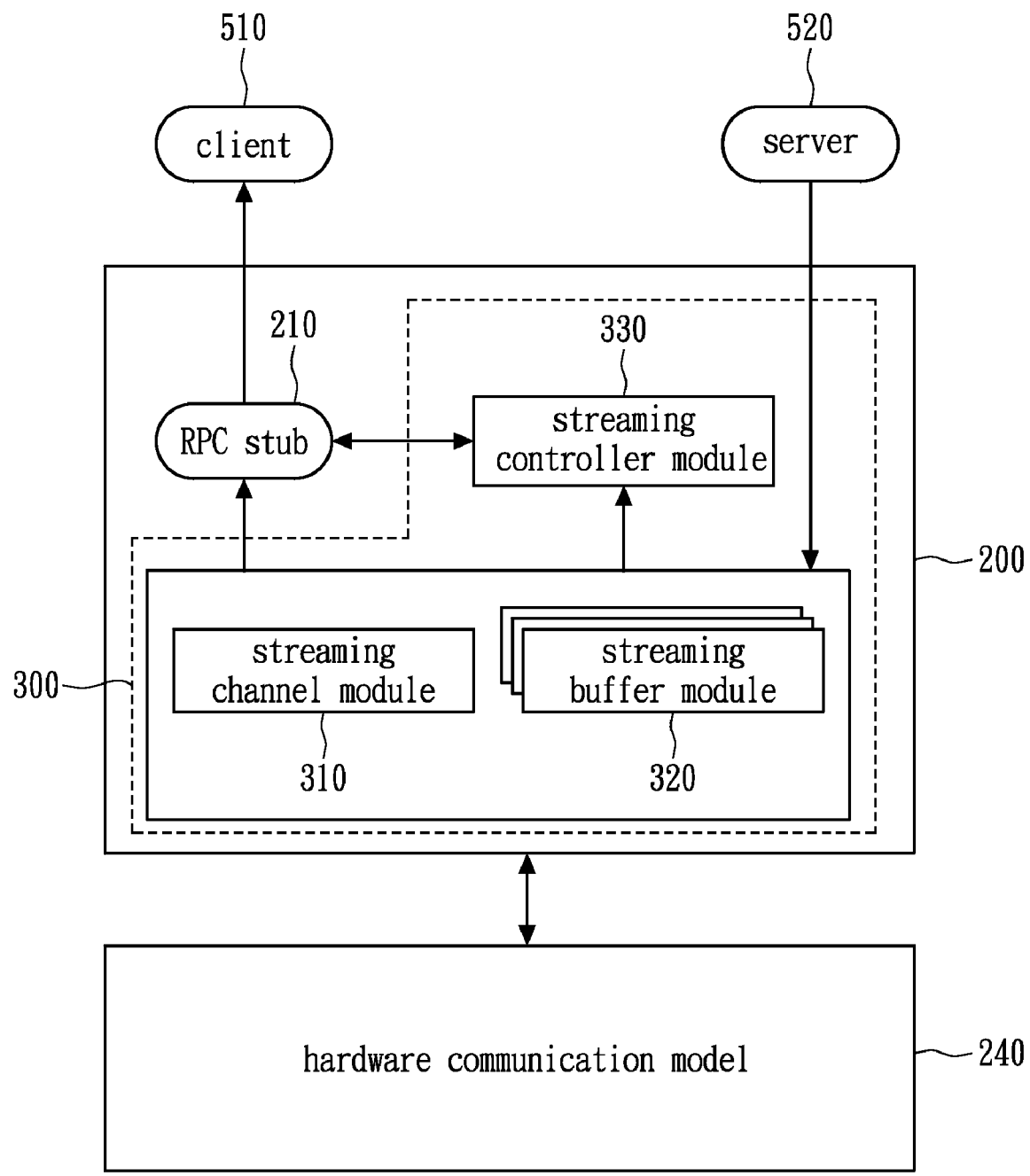
FIG. 3 shows a middleware framework of the method of streaming remote procedure invocation for multi-core systems according to one embodiment of the present invention.

FIG. 3 shows a middleware framework of the method of streaming remote procedure invocation for multi-core systems according to one embodiment of the present invention. The middleware 300 applied to the multi-core system comprising a plurality of client 510 and a plurality of servers 520. The middleware 300 comprises a streaming channel module 310, a plurality of streaming buffer modules 320 and a streaming controller module 330. The streaming channel module 310 is configured to be the communication channel for transmitting streaming data between the client 510 and the server 520. The streaming channel module 310 comprises a plurality of streaming channels, and such streaming channels can be distinguished by their own identification codes. The streaming buffer modules 320 are configured to temporarily store the data to be transmitted through the streaming channels, wherein each streaming channel comprises a plurality of streaming buffers to support buffering data when a streaming operation interface is executed. The streaming controller module 330 is configured to control the streaming channel module 310 and the streaming buffer modules 320.

As shown in FIG. 3, the middleware 300 is configured to control the streaming mechanism for remote procedure invocation between the client 510 and the server 520. As described above, the middleware 300 of the streaming remote procedure invocation for multi-core systems of the embodiments of the present invention is constructed on the hardware communication model 240 such that software designers can develop software based on the middleware 300 without considering the underlying hardware.

Figure 4:
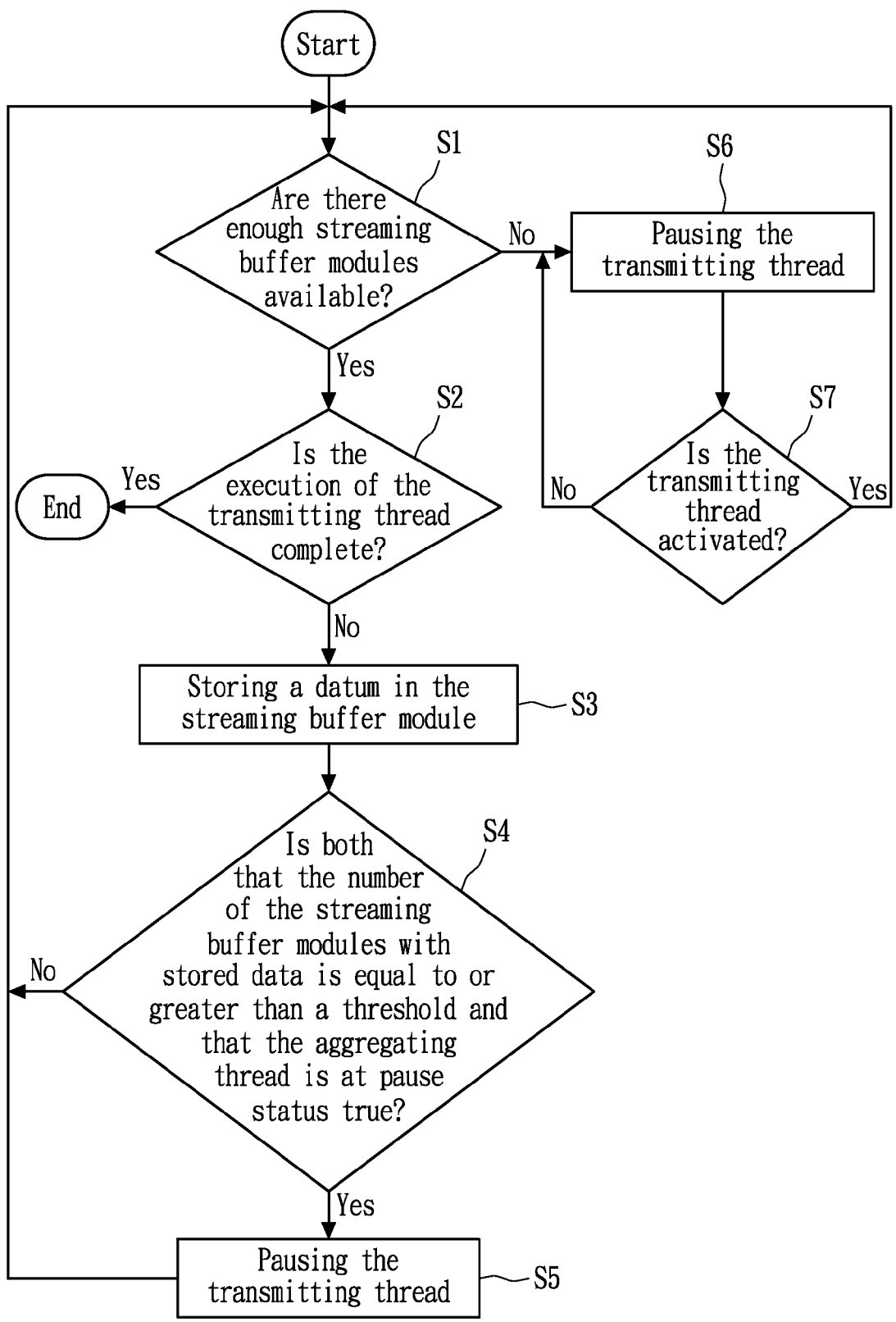
FIG. 4 shows a flow chart of the method of streaming remote procedure invocation for multi-core systems according to one embodiment of the present invention.
Figure 5:
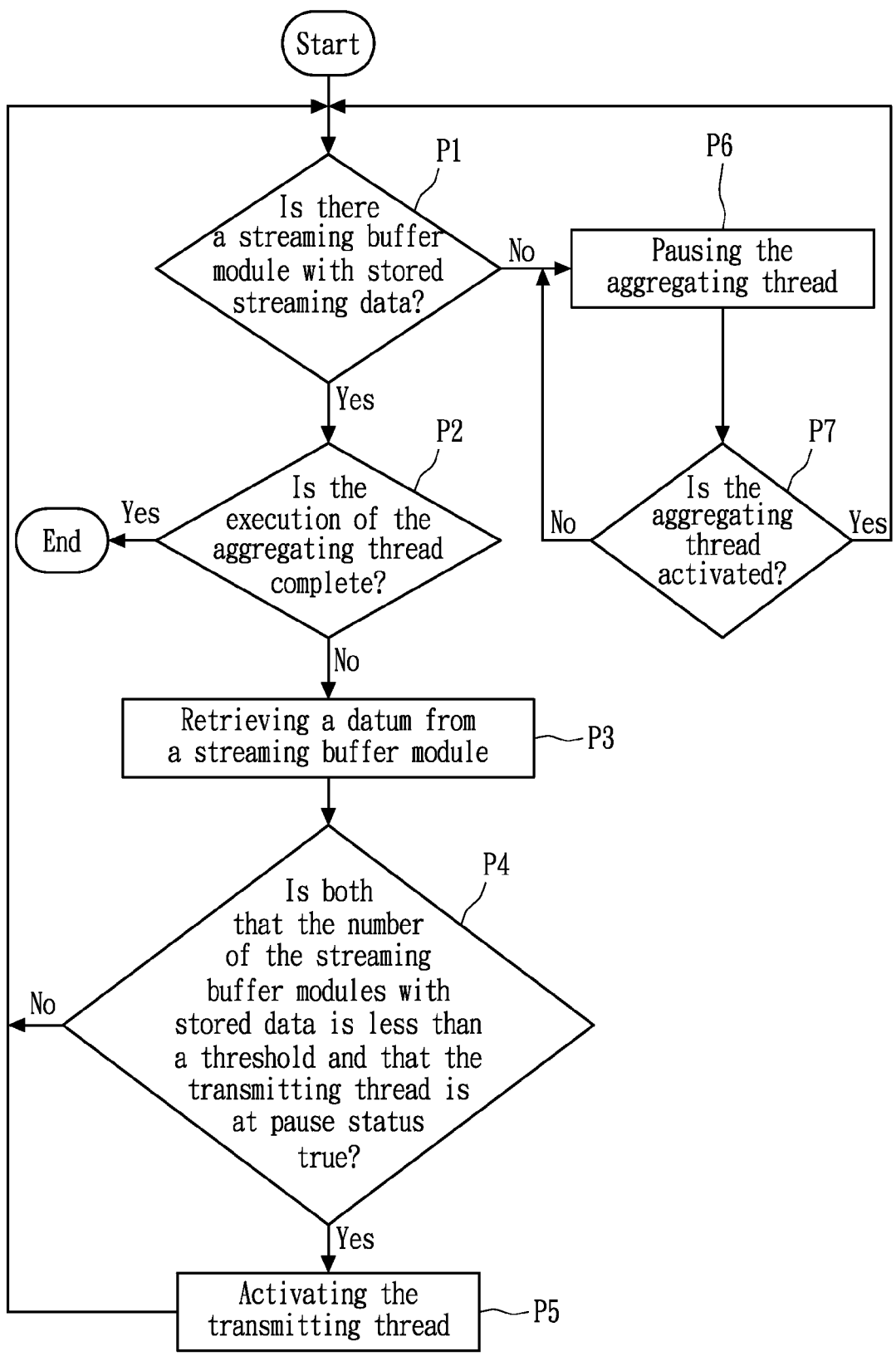
FIG. 5 shows a flow chart of the method of streaming remote procedure invocation for multi-core systems according to another embodiment of the present invention.

FIGS. 4 and 5 show flow charts of executing a transmitting thread and an aggregating thread in a multi-core system according to one embodiment of the method of streaming remote procedure invocation for multi-core systems of the present invention, wherein this embodiment is realized by the middleware 300. FIG. 4 shows the flow chart of executing a transmitting thread in a multi-core system according to one embodiment of the method of streaming remote procedure invocation for multi-core systems of the present invention. In step S1, it is determined whether there are enough streaming buffer modules 320 available. If the result is negative, step S6 is executed; otherwise, step S2 is executed. In step S2, it is determined whether the execution of the transmitting thread is complete. If the result is positive, the transmitting thread is ended; otherwise, step S3 is executed. In step S3, a datum is stored in a streaming buffer module 320, and step S4 is executed. In step S4, it is determined whether the number of the streaming buffer modules 320 with stored streaming data is equal to or greater than a threshold and the aggregating thread is at pause status. If the result is negative, step S1 is executed; otherwise, step S5 is executed. In step S5, the aggregating thread is activated. In step S6, the transmitting thread is paused, and step S7 is executed. In step S7, it is determined whether the transmitting thread is activated. If the result is positive, step S1 is executed; otherwise, step S6 is executed.

FIG. 5 shows the flow chart of executing an aggregating thread in a multi-core system according to one embodiment of the method of streaming remote procedure invocation for multi-core systems of the present invention. In step P1, it is determined whether there is a streaming buffer module 320 with stored streaming data. If the result is negative, step P6 is executed; otherwise, step P2 is executed. In step P2, it is determined whether the execution of the aggregating thread is complete. If the result is positive, the aggregating thread is ended; otherwise, step P3 is executed. In step P3, a datum is retrieved from a streaming buffer module 320 with stored streaming data, and step P4 is executed. In step P4, it is determined whether the number of the streaming buffer modules 320 with stored streaming data is less than a threshold and the transmitting thread is at pause status. If the result is negative, step P1 is executed; otherwise, step P5 is executed. In step P5, the transmitting thread is activated. In step P6, the aggregating thread is paused, and step P7 is executed. In step P7, it is determined whether the aggregating thread is activated. If the result is positive, step P1 is executed; otherwise, step P6 is executed.

As shown in FIGS. 4 and 5, the middleware 300 acts as a buffer between the client 510 and the server 520 such that the client 510 can continue to process another procedure after the client 510 invocates the server 520 to execute the procedure without waiting for the server 520 to return the result of the invocated procedure.

Referring back to FIG. 3, the middleware 300 is utilized to realize the embodiments of the method of streaming remote procedure invocation for multi-core systems of the present invention, wherein the streaming controller module 330 is configured to control the process shown in FIGS. 4 and 5, and the aforementioned threshold controls the communication speed between the processors of the multi-core system. The threshold can prevent the transmitting thread and the aggregating thread from being paused and activated repeatedly, which lowers the performance of the multi-core systems, due to the difference of the execution time between the transmitting thread and the aggregating thread. Ordinarily, a greater threshold can compensate a larger difference of the execution time between the transmitting thread and the aggregating thread. However, a greater threshold can also slow down the computing speed and thus violates the real-time processing requirement. Therefore, a proper threshold value is required.

Figure 6:
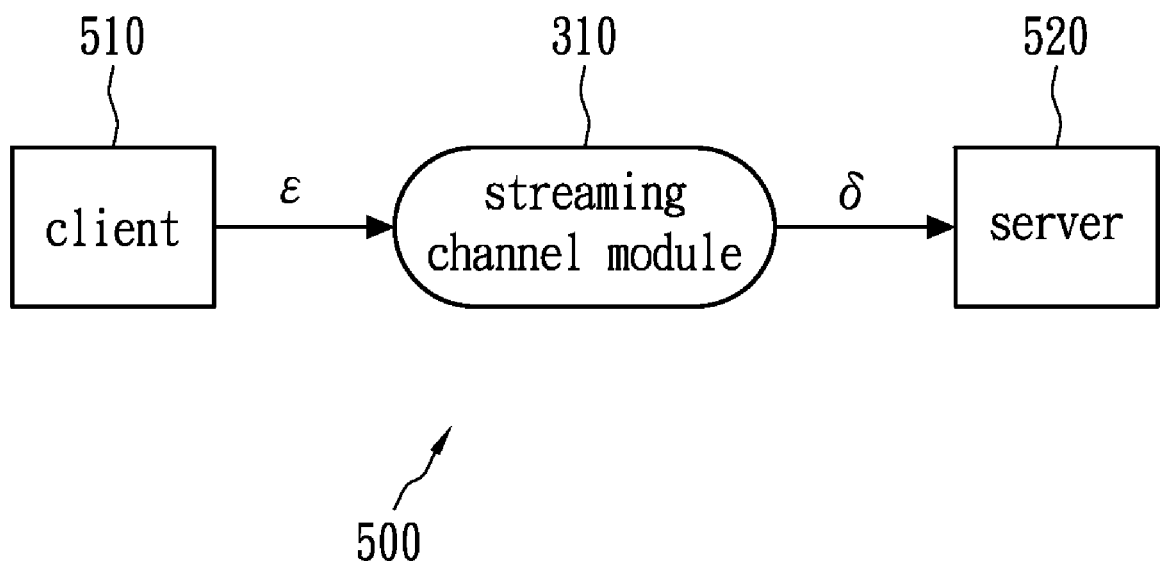
FIG. 6 shows a block diagram of a multi-core system utilizing the method of streaming remote procedure invocation for multi-core systems of the present invention.

FIG. 6 shows a block diagram of a multi-core system utilizing an embodiment of the method of streaming remote procedure invocation for multi-core systems of the present invention. The multi-core system 500 comprises the client 510, the server 520 and the streaming channel module 310 and applies the middleware 300 and an embodiment of the method of streaming remote procedure invocation for multi-core systems of the present invention. The client 510 and the server 520 access the streaming channel module 310 at average rates of $\epsilon$ and $\delta$ respectively. The response time of the server 520 to the nextprocessor stage is $T_r$, the time required to activate the server 520 is $T_{trigger}$, the data processing time required by the server 520 is $\alpha$, and the threshold value is n. If the transmitting thread of the server 520 is paused, the transmitting thread of the server 520 is not activated again until n streams of data are transmitted by the client 510. Therefore, the requirement of $T_r$ is:

$$T_r \geq T_{trigger} + \frac{n}{\varepsilon} + \alpha.$$

It can be obtained that the proper value for the threshold n is: $n \leq (T_r - T_{trigger} - \alpha) * \varepsilon$. In other words, the proper value for the threshold n is equal to or less than the result of the response time of the next processor stage of the server 520 minus the activation time of the server 520 and the data processing time required by the server 520 multiplied by the rate of the client 510 access to the streaming channel module 310.

In conclusion, the method of streaming remote procedure invocation for multi-core systems of the present invention and the middleware to implement the method provide the software designer with a developing environment with hierarchy higher than that of the communication module of the multi-core system. In addition, the method and the middleware enable the processors of the multi-core system to continue their own procedure while communicating with each other and hence improve the performance. Further, the method can significantly alleviate the problem of the difference between the computing speeds of the client and the server.

The above-described embodiments of the present invention are intended to be illustrative only. Those skilled in the art may devise numerous alternative embodiments without departing from the scope of the following claims.

What is claimed is:

1. A method of streaming remote procedure invocation for multi-core systems to execute a transmitting thread and an aggregating thread of a multi-core system, comprising the steps of:
   temporarily storing data to be transmitted;
   activating the aggregating thread if the amount of the temporarily stored data to be transmitted is equal to or greater than a first threshold and the aggregating thread is at pause status; and
   pausing the transmitting thread if there is no space to temporarily store the data to be transmitted;
   wherein the method further comprises the steps executed by a middleware of:
   retrieving data to be aggregated;
   activating the transmitting thread if the amount of data to be aggregated is less than a second threshold and the transmitting thread is at pause status; and
   pausing the aggregating thread if there is no data to be retrieved;
   wherein the middleware is implemented on a processor architecture comprising a plurality of clients and a plurality of servers, and the middleware comprises:
   a streaming channel module configured to be the communication channel for transmitting streaming data between the clients and the servers;
   a plurality of streaming buffer modules configured to temporarily store the data to be transmitted through the streaming channel module; and
   a streaming controller module configured to monitor the streaming channel module and control transmitted and aggregated behaviors operated on the streaming buffer modules;
   wherein the second threshold is equal to or less than the result of the response time of the next processor stage of a server minus the activation time of the server and the data processing time required by the server multiplied by the rate of a client access to the streaming channel module.

2. The method of claim 1, wherein the middleware is constructed on an upper level of a communication model of the multi-core system.

3. The method of claim 1, wherein the step of temporarily storing data to be transmitted is executed via the streaming buffer modules.

4. The method of claim 1, wherein the step of retrieving data to be aggregated is executed via the streaming buffer modules.

5. The method of claim 1, wherein the streaming channel module comprises a plurality of streaming channels.

6. The method of claim 5, wherein each streaming channel comprises a unique identification code.

7. The method of claim 1, which is utilized in the multi-core system.

* * * * *